US012333281B2

(12) United States Patent
Jayaraman et al.

(10) Patent No.: US 12,333,281 B2
(45) Date of Patent: Jun. 17, 2025

(54) METHOD AND SYSTEM FOR AUTOMATED DISCOVERY OF ARTIFICIAL INTELLIGENCE (AI)/ MACHINE LEARNING (ML) ASSETS IN AN ENTERPRISE

(71) Applicant: KONFER, INC., Fremont, CA (US)

(72) Inventors: Baskar Jayaraman, Fremont, CA (US); Debashish Chatterjee, Fremont, CA (US)

(73) Assignee: KONFER, INC., Fremont, CA (US)

( * ) Notice: Subject to any disclaimer, the term of this patent is extended or adjusted under 35 U.S.C. 154(b) by 153 days.

(21) Appl. No.: 18/296,171

(22) Filed: Apr. 5, 2023

(65) Prior Publication Data

US 2023/0385037 A1  Nov. 30, 2023

Related U.S. Application Data

(60) Provisional application No. 63/328,206, filed on Apr. 6, 2022.

(51) Int. Cl.
*G06F 8/36* (2018.01)
*G06F 8/41* (2018.01)

(52) U.S. Cl.
CPC ............... *G06F 8/36* (2013.01); *G06F 8/433* (2013.01)

(58) Field of Classification Search
CPC .................................... G06F 8/36; G06F 8/433
USPC ................................................. 717/120–123
See application file for complete search history.

(56) References Cited

U.S. PATENT DOCUMENTS

| 10,276,170 | B2* | 4/2019 | Gruber | G06F 16/9537 |
|---|---|---|---|---|
| 11,062,218 | B2* | 7/2021 | Aravamudan | G16B 50/00 |
| 11,720,346 | B2* | 8/2023 | Wu | G06F 8/70 |
| | | | | 707/741 |
| 2021/0406772 | A1* | 12/2021 | Shillingford | G06F 40/169 |

OTHER PUBLICATIONS

Ling et al., "Deep Graph Matching and Searching for Semantic Code Retrieval", 2021, arXiv, 21 pages. (Year: 2021).*
Cummins et al., "PROGRAML: A Graph-based Program Representation for Data Flow Analysis and Compiler Optimizations", 2021, Proceedings of the 38 th International Conference on Machine Learning, 10 pages. (Year: 2021).*

(Continued)

*Primary Examiner* — Ted T. Vo
(74) *Attorney, Agent, or Firm* — Joy S Goudie

(57) ABSTRACT

A method and a system for the automatic discovery of AI/ML models, their parameters, data input and output specifications, and data transforms in a production code repository using Artificial Intelligence/Machine Learning are disclosed. A method and system for automatic discovery of the location, identification, classification, and definition of the AI/ML models, their parameters, data input and output specifications, and data transforms in the production code repository using Artificial Intelligence/Machine Learning are also disclosed. The method and system utilize a plurality of source codes from a plurality of sources, such as open-source AI/ML libraries with the source codes, non-open-source AI/ML libraries, and tagged/pre-classified code, in conjunction with a production code repository, to identify the method of working on the plurality of source codes using Artificial Intelligence/Machine Learning.

14 Claims, 8 Drawing Sheets

(56) References Cited

OTHER PUBLICATIONS

Gu et al., "An Introduction to SemanticMatching Techniques in NLP andComputer Vision", 2021, Georgian Impact Blog, https://medium.com/georgian-impact-blog , 19 pages. (Year: 2021).*

* cited by examiner

METHOD AND SYSTEM FOR AUTOMATED DISCOVERY OF ARTIFICIAL INTELLIGENCE (AI)/ MACHINE LEARNING (ML) ASSETS IN AN ENTERPRISE

CROSS-REFERENCE TO RELATED APPLICATION

The application claims the priority of and is filed in continuation for the Provisional patent application (PPA) filed at USPTO on Apr. 6, 2022, with serial number No. 63/328,206 and entitled, "METHOD AND SYSTEM FOR AUTOMATED DISCOVERY OF ARTIFICIAL INTELLIGENCE (AI)/MACHINE LEARNING (ML) ASSETS IN AN ENTERPRISE, and the contents of which is included entirely as reference herein.

BACKGROUND

Technical Field

The embodiments herein relate to the field of computer applications. The embodiments herein are particularly related to a system and method for discovery of software assets and codes in an enterprise. The embodiments herein are more particularly related to a method and system for automatic discovery of the assets of Artificial Intelligence/Machine Learning (AI/ML), their parameters, data input and output specifications, data sources, and data transforms to provide bring visibility, governance, and as-built documentation to what is being done in a complex AI/ML-heavy code base.

Description of the Related Art

Source code is a collection of instructions and functions written by a programmer and processable by a machine, which can be statically or dynamically analyzed in order to find, for example, security flaws during automated tests. Static Code Analysis (SCA) is a selection of algorithms and techniques used to analyze source code. Static Code Analysis applies to code that is not running and detects vulnerabilities, errors or poorly written code at compile time. SCA can also reduce the cost of fixing security issues. Therefore, SCA tools are usually applied during early development to ensure code quality and security. Furthermore, Dynamic Code Analysis (DCA) follows the opposite approach. Instead of analyzing the software at compile time like SCA, under the approach of DCA, software is analyzed while it is operating. In more concrete terms, Dynamic Code Analysis "will monitor system memory, functional behavior, response time, and overall performance of the system". An advantage of DCA is the ability of identifying memory accesses and buffer overflows. Apart from that DCA is also used during and after deployment to consider live performance or detect potential issues, while Static Code Analysis is used to analyze software statically, without attempting to execute the code.

Recently, Machine Learning/Artificial Intelligence independently finds solutions for unsolved problems based on existing data and algorithms by recognizing patterns, regularities and deviations from these regularities. Machine learning/Artificial Intelligence has been recognized as a valid method for analyzing code and is considered to be promising for bug detection and prediction. Additionally, there exist first scientific thrust towards code analysis that incorporates AI/ML approaches. For example, a group of git repositories named Machine Learning for the Analysis of Source Code Text (MAST) is available open source. However, overall quality of any AI/ML based approach on source code analysis depends on the model employed and the training data or the pre-classified code that is used to build such model. Furthermore, there are no methods available to identify, locate and classify AI/ML source code in the production code repository using Artificial Intelligence/Machine learning approaches.

Hence, there is need for a method and a system for automatic discovery of the AI/ML source code, their parameters, data input and output specifications and data transforms in a production code repository using Artificial Intelligence/Machine Learning, while also paving way for automatic discovery of the location, identification, classification and definition of the AI/ML models, their parameters, data input and output specifications and data transforms, in the production code repository using Artificial Intelligence/Machine Learning, to bring about visibility, governance and as-built documentation in a complex AI/ML-heavy source code base.

The above-mentioned shortcomings, disadvantages and problems are addressed herein, and which will be understood by reading and studying the following specification.

OBJECTIVES OF THE EMBODIMENTS HEREIN

The principal object of the embodiments herein is to provide a method and system for automatic discovery of the AI/ML models, their parameters, data input and output specifications and data transforms in a production code repository using Artificial Intelligence/Machine Learning.

Another object of the embodiments herein is to provide a method and system for automatic discovery of the location, identification, classification and definition of the AI/ML models, their parameters, data input and output specifications and data transforms, in the production code repository using Artificial Intelligence/Machine Learning.

Yet another object of the embodiments herein is to provide a method and a system for automatic discovery of the open-source AI/ML libraries with the plurality of source code in the production code repository using Artificial Intelligence/Machine Learning, to identify the method of working of the open-source AI/ML libraries.

Yet another object of the embodiments herein is to provide a method and a system for automatic discovery of the non-open-source AI/ML libraries in a production code repository using Artificial Intelligence/Machine Learning thereby identifying the method of working of the non-open-source AI/ML libraries.

Yet another object of the embodiments herein is to provide a method and a system for automatic discovery of the location and identification of open-source AI/ML libraries and their parameters in the production code repository using Artificial Intelligence/Machine Learning.

Yet another object of the embodiments herein is to provide a method and a system for automatic discovery of the location and identification of non-open-source AI/ML APIs and their parameters in the production code repository using Artificial Intelligence/Machine Learning.

Yet another object of the embodiments herein is to provide a method and a system for automatic discovery of the dependency on external pre-classified AI/ML models using Artificial Intelligence/Machine Learning.

Yet another object of the embodiments herein is to provide a method and a system for automatic discovery of the sequence of AI/ML algorithms in the production code repository using Artificial Intelligence/Machine Learning.

Yet another object of the embodiments herein is to provide a method and a system for automatically producing a graphical view of the data and the code flow.

Yet another object of the embodiment herein is to provide a method and a system for automatically applying natural language processing techniques to automatically discover the AI/ML algorithms used and their parameters in a code base.

Yet another object of the embodiment herein is to provide a method and a system for automatically applying natural language processing techniques to automatically discover dependency on external pre-trained models in an AI/ML solution.

Yet another object of the embodiment herein is to provide a method and a system for automatically applying natural language processing techniques to automatically discover the external libraries used in an AI/ML solution.

Yet another object of the embodiment herein is to provide a method and a system for automatically applying natural language processing techniques to automatically discover the sequence of AI/ML algorithms in a code base of an application.

Yet another object of the embodiment herein is to provide a method and a system for automatically applying natural language processing techniques to automatically discover the data sources used in an AI/ML solution.

Yet another object of the embodiment herein is to provide a method and a system for automatically applying natural language processing techniques to automatically discover the data transforms used in an AI/ML solution.

Yet another object of the embodiment herein is to provide a method and a system for automatically producing a graphical view of the data and code flow.

These and other objects and advantages of the present invention will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments herein provide a computer-implemented method and system for the automatic discovery of the AI/ML models, their parameters, data input, and output specifications and data transforms in a production code repository using Artificial Intelligence/Machine Learning (AI/ML). In addition, the embodiments herein also provide a method and system for the automatic discovery of the location, identification, classification, and definition of the AI/ML models, their parameters, data input, and output specifications, and data transforms, in the production code repository using Artificial Intelligence/Machine Learning.

According to one embodiment herein, a computer-implemented method is provided for the automatic discovery of artificial intelligence/machine learning (AI/ML) models, their parameters, data input and output specifications, and data transforms in a production code repository using AI/ML. The method comprises automatically analyzing a plurality of source code from a plurality of sources in conjunction with a production code repository, to identify a method of working on the plurality of source code using AI/ML. The plurality of sources comprises open-source AI/ML libraries with source code, non-open-source AI/ML libraries with API documentation, and tagged/pre-classified code for AI/ML models, including data transforms, data input, and output specifications. The method further involves performing a semantic match for the plurality of source code embedded in the plurality of sources in conjunction with the production code repository. Furthermore, the semantic match provides the location and identification of the open-source AI/ML libraries and non-open-source AI/ML libraries, and their parameters in the production code repository. The semantic match also provides location, identification, classification, and definition of data transforms and data input and output specification of the tagged/pre-classified code in the production code repository. In addition, the method involves generating a graphical view of data and a source code flow. The graphical view of the data helps to track the flow of data through the plurality of source code and also depicts the fact that the data is read into a variable, and the data read into the variable is fed into a function, which fits a machine learning (ML) model. Moreover, if there are other data transformation steps in the middle, the graphical view of the data also captures them. Furthermore, the graphical view of a source code flow is a graph depicting function calls, which reads a file and then trains an ML model. For instance, if there is a piece of source code that first reads a file and then trains an ML model using an ML algorithm, then the source code flow will depict that the function that reads a file is then calling the function that trains an ML model.

According to one embodiment herein, a method for automatically analyzing the plurality of source codes from the plurality of sources in conjunction with the production code repository is provided. A source code is often hosted in a repository management system, such as GitHub, GitLab, and analysis is done using often available connectors code. The method involves recursively crawling through the plurality of source code embedded in the production code repository. The method further involves selecting a source code file of interest from the plurality of source codes, based on the extension of the source code. For example, with python code analysis, .py files are analyzed. Furthermore, the method involves building a knowledge graph for each of the selected source code files, based on the significant characteristics of the selected source code file in a knowledge graph database. The significant characteristics include imported libraries, classes, methods, functions, and variables referenced, set, and used in the selected source code file from the imported libraries. Moreover, the significant characteristics also include the selected source code file and the line numbers of the selected source code file being used.

According to one embodiment herein, the semantic match for the non-open-source AI/ML libraries comprises matching keywords between Application Programming Interface (API) documentation for the non-open-source AI/ML libraries and the production code repository. The matching keywords are carried out in the context of the plurality of source code that surrounds a given word of interest. Furthermore, the semantic match further creates a dense high-dimensional embedding of the API documentation for the non-open-source AI/ML libraries and the production code repository using AI/ML techniques to compute the similarity between two embedded vectors. The dense high-dimensional embedding is a technique that converts a piece of text into a large vector of numbers. The technique of dense high-dimensional embedding a piece of text (for example a word) is based on similarly sized pieces of text surrounding other words. For example, in case of comparing two words, the first word is computed/embedded into a vector at first, based on its surrounding context. Also, the vector representation of the second word is computed based on its context. Then the vector dot product of these two vectors, is computed to obtain the similarity. As known in mathematics, two vectors that are identical to each other have a similarity of one. Similarly, two vectors that are completely different from each other have a similarity of zero. Furthermore, the method for creating the dense high-dimensional embedding comprises embedding a piece of text or a word into a vector, based on similarly sized pieces of text or context surrounding the piece of text.

According to one embodiment herein, the semantic match for the open-source AI/ML libraries comprises matching keywords between the open-source AI/ML libraries and the production code repository. The matching keywords are carried out in the context of matching a vector associated with a keyword against a set of keywords, and the vector determines if the keyword is contextually similar to another keyword. Furthermore, the semantic match creates a dense high-dimensional embedding of the open-source AI/ML libraries and the production code repository using AI/ML techniques to compute the similarity between two embedded vectors. The dense high-dimensional embedding is a technique that converts a piece of text into a large vector of numbers, and the method for creating the dense high-dimensional embedding comprises embedding a piece of text or a word into a vector, based on similarly sized pieces of text or context surrounding the piece of text.

According to one embodiment herein, the semantic match for the tagged/pre-classified code in conjunction with the production code repository provides the ML model, that predicts whether a piece of production code in the production code repository is of a certain class of tagged/pre-classified code and also predicts data inputs and outputs and data transforms as ascertained by the semantic match.

According to one embodiment herein, a method is provided for conducting the semantic match for the tagged/pre-classified code in conjunction with the production code repository. The method involves establishing a large repository of open-source code and manually annotating significant pieces of open-source code in the large repository, which is the tagged/pre-classified code. The significant pieces of the open-source code include keywords and snippets of the open-source code carrying out the functions of AI/ML. The tagged/pre-classified code is assumed to be left-hand side (LHS). The method further involves embedding the annotated significant pieces of the open-source code in to a vector and splitting the non-open-source code into fragments, including keywords and snippets, embedding the snippets into vectors and assuming the embedded snippets to be right hand side (RHS). The method further involves matching the vectors of the RHS with each vector on the LHS, and determining the LHS vector most similar to the RHS vector. In addition, the method involves associating the RHS vector to the corresponding LHS vector, as the corresponding snippet of the LHS vector is already tagged/pre-classified with significant information. Finally, the method involves associating significant information and the meaning of the RHS vector with the production code repository.

According to one embodiment herein, the location and identification of the open-source AI/ML libraries and non-open-source AI/ML libraries, and their parameters in the production code repository during the semantic match provides pre-generated queries comprising information of the files and location of those files in a specific library function to read a data file, flow of variable into a function, once the contents of the file are read into the variable, ascertaining the function as AI/ML and determining in which source code file the AI/ML function is used.

According to one embodiment herein, the method for providing the location, identification, classification and definition of data transforms and data input and output specification of the tagged/pre-classified code in the production code repository during the semantic match is provided. The method involves creating a semantically searchable knowledge base from the large repository of open-source code and tagging the open-source code for the location, classification, data transforms, data input, and outputs. The method further involves creating queries to query the knowledge base, to produce an output in terms of location, classification, data transforms, and data input and output specification of the tagged/pre-classified code.

According to one embodiment herein, a computer-implemented system for the automatic discovery of artificial intelligence/machine learning (AI/ML) models, their parameters data input and output specifications, and data transforms in a production code repository using AI/ML is provided. The system comprises an analysis module configured to automatically analyze a plurality of source code from a plurality of sources in conjunction with a production code repository, to identify a method of working, on the plurality of source code using AI/ML. The plurality of sources comprises open-source AI/ML libraries with source code, non-open-source AI/ML libraries with API documentation, and tagged/pre-classified code for AI/ML models, including data transforms, data input, and output specifications. The system further comprises a semantic match module configured to perform a semantic match for the plurality of source code embedded in the plurality of sources in conjunction with the production code repository and provides location and identification of the open-source AI/ML libraries and non-open-source AI/ML libraries, and their parameters in the production code repository. The semantic match module is also configured to provide the location, identification, classification, and definition of data transforms and data input and output specification of the tagged/pre-classified code in the production code repository. Furthermore, the system comprises a graphical view generation module configured to generate a graphical view of data and a source code flow. The graphical view of the data helps to track the flow of data through the plurality of source code and also depicts the fact that the data is read into a variable, and the data read into the variable is fed into a function, which fits a machine learning (ML) model. Furthermore, the graphical view of a source code flow is a graph depicting function calls, reads a file, and then trains an ML model.

According to one embodiment herein, the analysis module automatically analyzes the plurality of source code from the plurality of sources in conjunction with the production code repository. The method of analysis carried out by the analysis module is provided. The method involves recursively crawling through the plurality of source code embedded in the production code repository. The method further involves selecting a source code file of interest from the plurality of source code, based on the extension of the source code. For example, with python code analysis, .py files are analyzed. Furthermore, the method involves building a knowledge graph for each of the source code files selected, based on the significant characteristics of the selected source code file in a knowledge graph database. The significant characteristics include imported libraries, classes, methods, functions, and variables referenced, set, and used in the selected source code file from the imported libraries. Moreover, the significant characteristics also include the selected source code file and the line numbers of the selected source code file being used.

According to one embodiment herein, the semantic match module is configured to perform semantic match for the non-open-source AI/ML libraries by matching keywords between Application Programming Interface (API) documentation for the non-open-source AI/ML libraries and the production code repository. The matching keywords are carried out by the semantic module in the context of the plurality of source code that surrounds a given word of interest. The semantic match module is further configured to create a dense high-dimensional embedding of the API documentation for the non-open-source AI/ML libraries and the production code repository using AI/ML techniques to compute the similarity between two embedded vectors. The dense high-dimensional embedding is a technique that converts a piece of text into a large vector of numbers. The technique of dense high-dimensional embedding a piece of text (for example a word) is based on similarly sized pieces of text surrounding other words. For example, consider there are two words to be compared. First, compute/embed the first word into a vector based on its surrounding context. Also, compute the vector representation of the second word based on its context. Then compute the vector dot product of these two vectors, to obtain the similarity. As known in mathematics, two vectors that are identical to each other will have a similarity of one. Similarly, two vectors that are completely different from each other will have a similarity of zero. Furthermore, the method for creating the dense high-dimensional embedding by the semantic match module comprises embedding a piece of text or a word into a vector, based on similarly sized pieces of text or context surrounding the piece of text.

According to one embodiment herein, the semantic match module performs the semantic match for the open-source AI/ML libraries by matching keywords between the open-source AI/ML libraries and the production code repository. The matching keywords are carried out by the semantic match module in the context of matching a vector associated with a keyword against a set of keywords. The vector determines if the keyword is contextually similar to another keyword. Further, the semantic match module creates a dense high-dimensional embedding of the open-source AI/ML libraries and the production code repository using AI/ML techniques to compute the similarity between two embedded vectors. The dense high-dimensional embedding is a technique that converts a piece of text into a large vector of numbers. Moreover, the method for creating the dense high-dimensional embeddings comprises embedding a piece of text or a word into a vector, based on similarly sized pieces of text or context surrounding the piece of text.

According to one embodiment herein, the semantic match module is also configured to perform semantic match for the tagged/pre-classified code in conjunction with the production code repository and provides the ML model, that predicts whether a piece of production code in the production code repository is of a certain class of tagged/pre-classified code and also predicts data inputs and outputs and data transforms as ascertained by the semantic match module.

According to one embodiment herein, the method for conducting the semantic match for the tagged/pre-classified code in conjunction with the production code repository by the semantic match module is provided. The method involves establishing a large repository of open-source code and manually annotating significant pieces of open-source code in the large repository, which is the tagged/pre-classified code. The significant pieces of the open-source code include keywords and snippets of the open-source code carrying out the functions of AI/ML. The tagged/pre-classified code is assumed to be left-hand side (LHS). The method further involves embedding the annotated significant pieces of the open-source code into a vector and splitting the non-open-source code into fragments, including keywords and snippets, embedding the snippets into vectors and assuming the embedded snippets to be right-hand side (RHS). The method further involves matching the vectors of the RHS with each vector on the LHS and determining the LHS vector most similar to the RHS vector. In addition, the method involves associating the RHS vector to the corresponding LHS vector, as the corresponding snippet of the LHS vector is already tagged/pre-classified with significant information. Finally, the method involves associating significant information and the meaning of the RHS vector with the production code repository.

According to one embodiment herein, the semantic match module also provides the location and identification of the open-source AI/ML libraries and non-open-source AI/ML libraries, and their parameters in the production code repository during the semantic match by making pre-generated queries comprising information of the files and location of those files in a specific library function to read a data file, flow of variable into a function, once the contents of the file are read into the variable, ascertaining the function as AI/ML and determining in which source code file the AI/ML function is used.

According to one embodiment herein, the method for providing the location, identification, classification and definition of data transforms and data input and output specification of the tagged/pre-classified code in the production code repository during the semantic match by the semantic match module is provided. The method comprises creating a semantically searchable knowledge base from the large repository of open-source code and tagging the open-source code for the location, classification, data transforms, data input, and outputs. The method further involves creating queries to query the knowledge base, to produce an output in terms of location, classification, data transforms, and data input and output specification of the tagged/pre-classified code.

The foregoing summary is illustrative only and is not intended to be in any way limiting. In addition to the illustrative aspects, embodiments, and features described above, further aspects, embodiments, and features will become apparent by reference to the drawings and the following detailed description.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
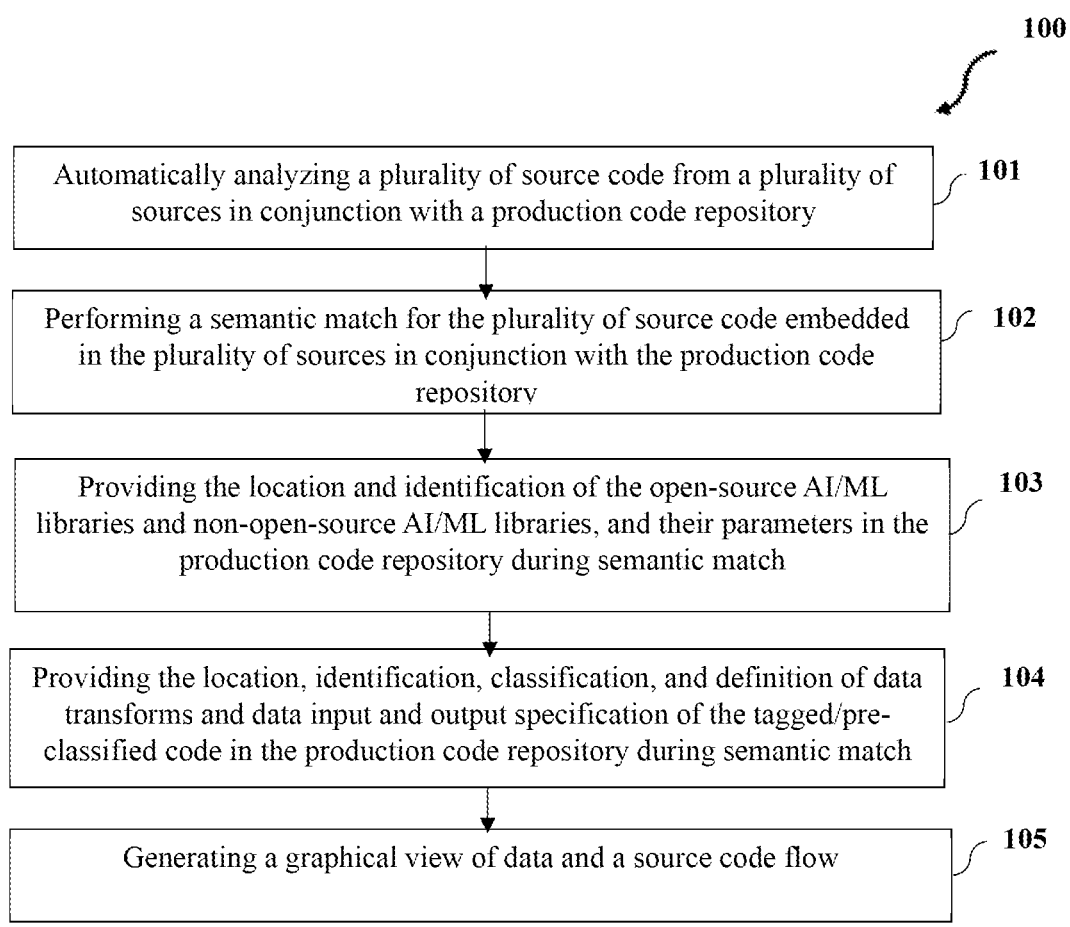
FIG. 1 illustrates a flowchart depicting a method for automatic discovery of the AI/ML models, their parameters, data input, and output specifications and data transforms in a production code repository using Artificial Intelligence/Machine Learning, according to one embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The various embodiments herein provide a computer-implemented method and system for the automatic discovery of the AI/ML models, their parameters, data input, and output specifications and data transforms in a production code repository using Artificial Intelligence/Machine Learning (AI/ML). In addition, the embodiments herein also provide a method and system for the automatic discovery of the location, identification, classification, and definition of the AI/ML models, their parameters, data input, and output specifications, and data transforms, in the production code repository using Artificial Intelligence/Machine Learning.

According to one embodiment herein, a computer-implemented method for the automatic discovery of artificial intelligence/machine learning (AI/ML) models, their parameters data input and output specifications, and data transforms in a production code repository using AI/ML is provided. The method comprises automatically analyzing a plurality of source code from a plurality of sources in conjunction with a production code repository, to identify a method of working on the plurality of source code using AI/ML. The plurality of sources comprises open-source AI/ML libraries with source code, non-open-source AI/ML libraries with API documentation, and tagged/pre-classified code for AI/ML models, including data transforms, data input, and output specifications. The method further involves performing a semantic match for the plurality of source code embedded in the plurality of sources in conjunction with the production code repository. Furthermore, the semantic match provides the location and identification of the open-source AI/ML libraries and non-open-source AI/ML libraries, and their parameters in the production code repository. The semantic match also provides location, identification, classification, and definition of data transforms and data input and output specification of the tagged/pre-classified code in the production code repository. In addition, the method involves generating a graphical view of data and a source code flow. The graphical view of the data helps to track the flow of data through the plurality of source code and also depicts the fact that the data is read into a variable, and the data read into the variable is fed into a function, which fits a machine learning (ML) model. Moreover, if there are other data transformation steps in the middle, the graphical view of the data also captures them. Furthermore, the graphical view of a source code flow is a graph depicting function calls, which reads a file and then trains an ML model. For instance, if there is a piece of source code that first reads a file and then trains an ML model using an ML algorithm, then the source code flow will depict that the function that reads a file is then calling the function that trains an ML model.

According to one embodiment herein, the method for automatically analyzing the plurality of source code from the plurality of sources in conjunction with the production code repository is provided. A source code is often hosted in a repository management systems, such as GitHub, GitLab, and using often available connectors code analysis is done. The method involves recursively crawling through the plurality of source code embedded in the production code repository. The method further involves selecting a source code file of interest from the plurality of source code, based on the extension of the source code. For example, with python code analysis, .py files are analyzed. Furthermore, the method involves building a knowledge graph for each of the source code files selected, based on the significant characteristics of the selected source code file in a knowledge graph database. The significant characteristics include imported libraries, classes, methods, functions, and variables referenced, set, and used in the selected source code file from the imported libraries. Moreover, the significant characteristics also include the selected source code file and the line numbers of the selected source code file being used.

According to one embodiment herein, the semantic match for the non-open-source AI/ML libraries comprises matching keywords between Application Programming Interface (API) documentation for the non-open-source AI/ML libraries and the production code repository. The matching keywords are carried out in the context of the plurality of source code that surrounds a given word of interest. Furthermore, the semantic match further creates a dense high-dimensional embedding of the API documentation for the non-open-source AI/ML libraries and the production code repository using AI/ML techniques to compute the similarity between two embedded vectors. The dense high-dimensional embedding is a technique that converts a piece of text into a large vector of numbers. The technique of dense high-dimensional embedding a piece of text (for example a word) is based on similarly sized pieces of text surrounding other words. For example, consider there are two words to be compared. First, compute/embed the first word into a vector based on its surrounding context. Also, compute the vector representation of the second word based on its context. Then compute the vector dot product of these two vectors, to obtain the similarity. As known in mathematics, two vectors that are identical to each other will have a similarity of one. Similarly, two vectors that are completely different from each other will have a similarity of zero. Furthermore, the method for creating the dense high-dimensional embedding comprises embedding a piece of text or a word into a vector, based on similarly sized pieces of text or context surrounding the piece of text.

According to one embodiment herein, the semantic match for the open-source AI/ML libraries comprises matching keywords between the open-source AI/ML libraries and the production code repository. The matching keywords are carried out in the context of matching a vector associated with a keyword against a set of keywords, and the vector determines if the keyword is contextually similar to another keyword. Furthermore, the semantic match creates a dense high-dimensional embedding of the open-source AI/ML libraries and the production code repository using AI/ML techniques to compute the similarity between two embedded vectors. The dense high-dimensional embedding is a technique that converts a piece of text into a large vector of numbers, and the method for creating the dense high-dimensional embedding comprises embedding a piece of text or a word into a vector, based on similarly sized pieces of text or context surrounding the piece of text.

According to one embodiment herein, the semantic match for the tagged/pre-classified code in conjunction with the production code repository provides the ML model, that predicts whether a piece of production code in the production code repository is of a certain class of tagged/pre-classified code and also predicts data inputs and outputs and data transforms as ascertained by the semantic match.

According to one embodiment herein, the method for conducting the semantic match for the tagged/pre-classified code in conjunction with the production code repository is provided. The method involves establishing a large repository of open-source code and manually annotating significant pieces of open-source code in the large repository, which is the tagged/pre-classified code. The significant pieces of the open-source code include keywords and snippets of the open-source code carrying out the functions of AI/ML. The tagged/pre-classified code is assumed to be left-hand side (LHS). The method further involves embedding the annotated significant pieces of the open-source code in to a vector and splitting the non-open-source code into fragments, including keywords and snippets, embedding the snippets into vectors and assuming the embedded snippets to be right hand side (RHS). The method further involves matching the vectors of the RHS with each vector on the LHS, and determining the LHS vector most similar to the RHS vector. In addition, the method involves associating the RHS vector to the corresponding LHS vector, as the corresponding snippet of the LHS vector is already tagged/pre-classified with significant information. Finally, the method involves associating significant information and the meaning of the RHS vector with the production code repository.

According to one embodiment herein, the location and identification of the open-source AI/ML libraries and non-open-source AI/ML libraries, and their parameters in the production code repository during the semantic match provides pre-generated queries comprising information of the files and location of those files in a specific library function to read a data file, flow of variable into a function, once the contents of the file are read into the variable, ascertaining the function as AI/ML and determining in which source code file the AI/ML function is used.

According to one embodiment herein, the method for providing the location, identification, classification and definition of data transforms and data input and output specification of the tagged/pre-classified code in the production code repository during the semantic match is provided. The method involves creating a semantically searchable knowledge base from the large repository of open-source code and tagging the open-source code for the location, classification, data transforms, data input, and outputs. The method further involves creating queries to query the knowledge base, to produce an output in terms of location, classification, data transforms, and data input and output specification of the tagged/pre-classified code.

According to one embodiment herein, a computer-implemented system for the automatic discovery of artificial intelligence/machine learning (AI/ML) models, their parameters data input and output specifications, and data transforms in a production code repository using AI/ML is provided. The system comprises an analysis module configured to automatically analyze a plurality of source code from a plurality of sources in conjunction with a production code repository, to identify a method of working, on the plurality of source code using AI/ML. The plurality of sources comprises open-source AI/ML libraries with source code, non-open-source AI/ML libraries with API documentation, and tagged/pre-classified code for AI/ML models, including data transforms, data input, and output specifications. The system further comprises a semantic match module configured to perform a semantic match for the plurality of source code embedded in the plurality of sources in conjunction with the production code repository and provides location and identification of the open-source AI/ML libraries and non-open-source AI/ML libraries, and their parameters in the production code repository. The semantic match module is also configured to provide the location, identification, classification, and definition of data transforms and data input and output specification of the tagged/pre-classified code in the production code repository. Furthermore, the system comprises a graphical view generation module configured to generate a graphical view of data and a source code flow. The graphical view of the data helps to track the flow of data through the plurality of source code and also depicts the fact that the data is read into a variable, and the data read into the variable is fed into a function, which fits a machine learning (ML) model. Furthermore, the graphical view of a source code flow is a graph depicting function calls, reads a file, and then trains an ML model.

According to one embodiment herein, the analysis module automatically analyzes the plurality of source code from the plurality of sources in conjunction with the production code repository. The method of analysis carried out by the analysis module is provided. The method involves recursively crawling through the plurality of source code embedded in the production code repository. The method further involves selecting a source code file of interest from the plurality of source code, based on the extension of the source code. For example, with python code analysis, .py files are analyzed. Furthermore, the method involves building a knowledge graph for each of the source code files selected, based on the significant characteristics of the selected source code file in a knowledge graph database. The significant characteristics include imported libraries, classes, methods, functions, and variables referenced, set, and used in the selected source code file from the imported libraries. Moreover, the significant characteristics also include the selected source code file and the line numbers of the selected source code file being used.

According to one embodiment herein, the semantic match module is configured to perform semantic match for the non-open-source AI/ML libraries by matching keywords between Application Programming Interface (API) documentation for the non-open-source AI/ML libraries and the production code repository. The matching keywords are carried out by the semantic module in the context of the plurality of source code that surrounds a given word of interest. The semantic match module is further configured to create a dense high-dimensional embedding of the API documentation for the non-open-source AI/ML libraries and the production code repository using AI/ML techniques to compute the similarity between two embedded vectors. The dense high-dimensional embedding is a technique that converts a piece of text into a large vector of numbers. The technique of dense high-dimensional embedding a piece of text (for example a word) is based on similarly sized pieces of text surrounding other words. For example, consider there are two words to be compared. First, compute/embed the first word into a vector based on its surrounding context. Also, compute the vector representation of the second word based on its context. Then compute the vector dot product of these two vectors, to obtain the similarity. As known in mathematics, two vectors that are identical to each other will have a similarity of one. Similarly, two vectors that are completely different from each other will have a similarity of zero. Furthermore, the method for creating the dense high-dimensional embedding by the semantic match module comprises embedding a piece of text or a word into a vector, based on similarly sized pieces of text or context surrounding the piece of text.

According to one embodiment herein, the semantic match module performs the semantic match for the open-source AI/ML libraries by matching keywords between the open-source AI/ML libraries and the production code repository. The matching keywords are carried out by the semantic match module in the context of matching a vector associated with a keyword against a set of keywords. The vector determines if the keyword is contextually similar to another keyword. Further, the semantic match module creates a dense high-dimensional embedding of the open-source AI/ML libraries and the production code repository using AI/ML techniques to compute the similarity between two embedded vectors. The dense high-dimensional embedding is a technique that converts a piece of text into a large vector of numbers. Moreover, the method for creating the dense high-dimensional embeddings comprises embedding a piece of text or a word into a vector, based on similarly sized pieces of text or context surrounding the piece of text.

According to one embodiment herein, the semantic match module is also configured to perform semantic match for the tagged/pre-classified code in conjunction with the production code repository and provides the ML model, that predicts whether a piece of production code in the production code repository is of a certain class of tagged/pre-classified code and also predicts data inputs and outputs and data transforms as ascertained by the semantic match module.

According to one embodiment herein, the method for conducting the semantic match for the tagged/pre-classified code in conjunction with the production code repository by the semantic match module is provided. The method involves establishing a large repository of open-source code and manually annotating significant pieces of open-source code in the large repository, which is the tagged/pre-classified code. The significant pieces of the open-source code include keywords and snippets of the open-source code carrying out the functions of AI/ML. The tagged/pre-classified code is assumed to be left-hand side (LHS). The method further involves embedding the annotated significant pieces of the open-source code into a vector and splitting the non-open-source code into fragments, including keywords and snippets, embedding the snippets into vectors and assuming the embedded snippets to be right-hand side (RHS). The method further involves matching the vectors of the RHS with each vector on the LHS and determining the LHS vector most similar to the RHS vector. In addition, the method involves associating the RHS vector to the corresponding LHS vector, as the corresponding snippet of the LHS vector is already tagged/pre-classified with significant information. Finally, the method involves associating significant information and the meaning of the RHS vector with the production code repository.

According to one embodiment herein, the semantic match module also provides the location and identification of the open-source AI/ML libraries and non-open-source AI/ML libraries, and their parameters in the production code repository during the semantic match by making pre-generated queries comprising information of the files and location of those files in a specific library function to read a data file, flow of variable into a function, once the contents of the file are read into the variable, ascertaining the function as AI/ML and determining in which source code file the AI/ML function is used.

According to one embodiment herein, the method for providing the location, identification, classification and definition of data transforms and data input and output specification of the tagged/pre-classified code in the production code repository during the semantic match by the semantic match module is provided. The method comprises creating a semantically searchable knowledge base from the large repository of open-source code and tagging the open-source code for the location, classification, data transforms, data input, and outputs. The method further involves creating queries to query the knowledge base, to produce an output in terms of location, classification, data transforms, and data input and output specification of the tagged/pre-classified code.

FIG. 1 illustrates a flowchart depicting a method for automatic discovery of the AI/ML models, their parameters, data input, and output specifications and data transforms in a production code repository using Artificial Intelligence/Machine Learning, according to one embodiment herein. The method 100 comprises automatically analyzing a plurality of source code from a plurality of sources in conjunction with a production code repository at step 101, to identify a method of working on the plurality of source code using AI/ML. The plurality of sources comprises open-source AI/ML libraries with source code, non-open-source AI/ML libraries with API documentation and tagged/pre-classified code for AI/ML models, including data transforms, data input, and output specifications. The method 100 further involves performing a semantic match for the plurality of source code embedded in the plurality of sources in conjunction with the production code repository at step 102. Furthermore, the semantic match provides the location and identification of the open-source AI/ML libraries and non-open-source AI/ML libraries, and their parameters in the production code repository at step 103. The semantic match also provides location, identification, classification, and definition of data transforms and data input and output specification of the tagged/pre-classified code in the production code repository at step 104. In addition, the method 100 involves generating a graphical view of data and a source code flow at step 105. The graphical view of the data helps to track the flow of data through the plurality of source code and also depicts the fact that the data is read into a variable, and the data read into the variable is fed into a function, which fits a machine learning (ML) model. Moreover, if there are other data transformation steps in the middle, the graphical view of the data also captures them. Furthermore, the graphical view of a source code flow is a graph depicting function calls, which reads a file and then trains an ML model. For instance, if there is a piece of source code that first reads a file and then trains an ML model using an ML algorithm, then the source code flow will depict that the function that reads a file is then calling the function that trains an ML model.

Figure 2:
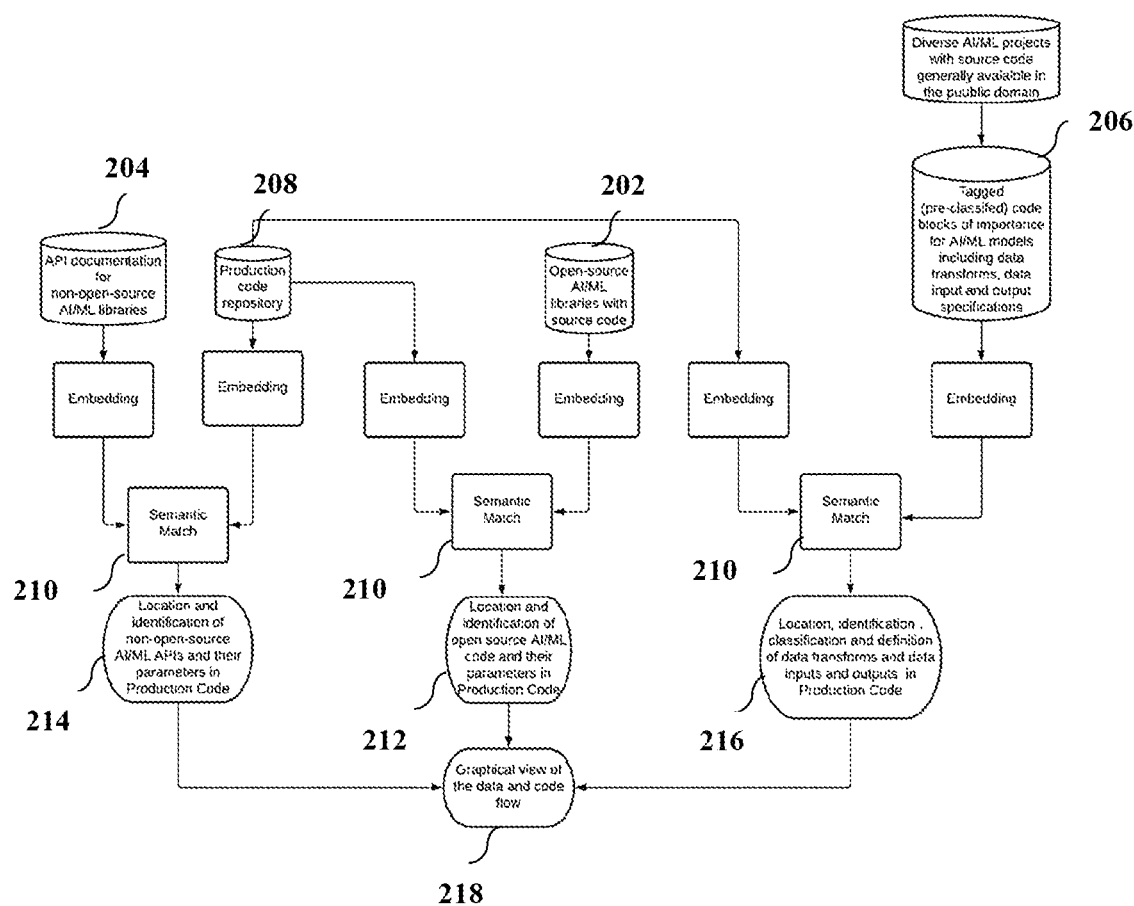
FIG. 2 illustrates a detailed flowchart on the method for automatic discovery of the AI/ML models, their parameters, data input, and output specifications and data transforms in a production code repository using Artificial Intelligence/Machine Learning, according to one embodiment herein.

FIG. 2 illustrates a detailed flowchart on the method for automatic discovery of the AI/ML models, their parameters, data input, and output specifications and data transforms in a production code repository using Artificial Intelligence/Machine Learning, according to one embodiment herein. The method disclosed herein provides automatic discovery/analysis of the plurality of source code from the plurality of sources, such as open-source AI/ML libraries with source code 202, non-open-source AI/ML libraries 204, and tagged/pre-classified code 206 in conjunction with the production code repository 208, to identify the method of working of the plurality of source code using Artificial Intelligence/Machine Learning. The method disclosed herein employs a semantic match 210 for the plurality of source code embedded in the plurality of sources such as open-source AI/ML libraries with source code 202, non-open-source AI/ML libraries 204 and tagged/pre-classified code 106 in conjunction with the production code repository 208. The semantic match 210 also provides the location and identification of open-source AI/ML 212 and non-open-source AI/ML 214 and their parameters in the production code repository. Furthermore, the semantic match 210 also provides location, identification, classification, and definition of data transforms and data input and output specifications of tagged/pre-classified code in the production code repository 216. Finally, the method disclosed herein provides graphical view of the data and source code flow 218.

Figure 3:
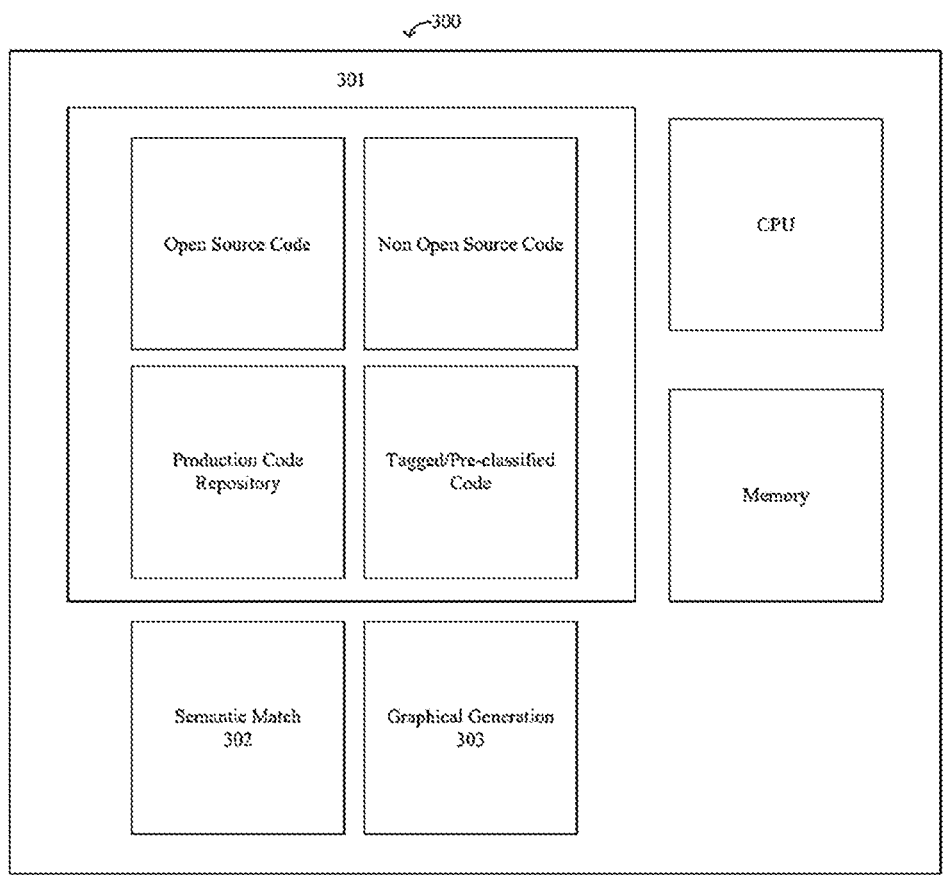
FIG. 3 illustrates an exemplary high-level decomposition of a computer-implemented system for automatic discovery of artificial intelligence/machine learning (AI/ML) models, their parameters data input and output specifications, and data transforms in a production code repository using AI/ML, according to one embodiment herein.

FIG. 3 illustrates an exemplary high-level decomposition of a computer-implemented system for automatic discovery of artificial intelligence/machine learning (AI/ML) models, their parameters data input and output specifications, and data transforms in a production code repository using AI/ML, according to one embodiment herein. In an embodiment, the system 300 comprises an analysis module 301 configured to automatically analyze a plurality of source code from a plurality of sources in conjunction with a production code repository, to identify a method of working, on the plurality of source code using AI/ML. The plurality of sources comprises open-source AI/ML libraries with source code, non-open-source AI/ML libraries with API documentation, and tagged/pre-classified code for AI/ML models, including data transforms, data input, and output specifications. The system 300 further comprises a semantic match module 302 configured to perform a semantic match for the plurality of source code embedded in the plurality of sources in conjunction with the production code repository and provides location and identification of the open-source AI/ML libraries and non-open-source AI/ML libraries, and their parameters in the production code repository. The semantic match module is also configured to provide the location, identification, classification, and definition of data transforms and data input and output specification of the tagged/pre-classified code in the production code repository. Furthermore, the system 300 comprises a graphical view generation module 303 configured to generate a graphical view of data and a source code flow. The graphical view of the data helps to track the flow of data through the plurality of source code and also depicts the fact that the data is read into a variable, and the data read into the variable is fed into a function, which fits a machine learning (ML) model. Furthermore, the graphical view of a source code flow is a graph depicting function calls, reads a file, and then trains an ML model.

Figure 4A:
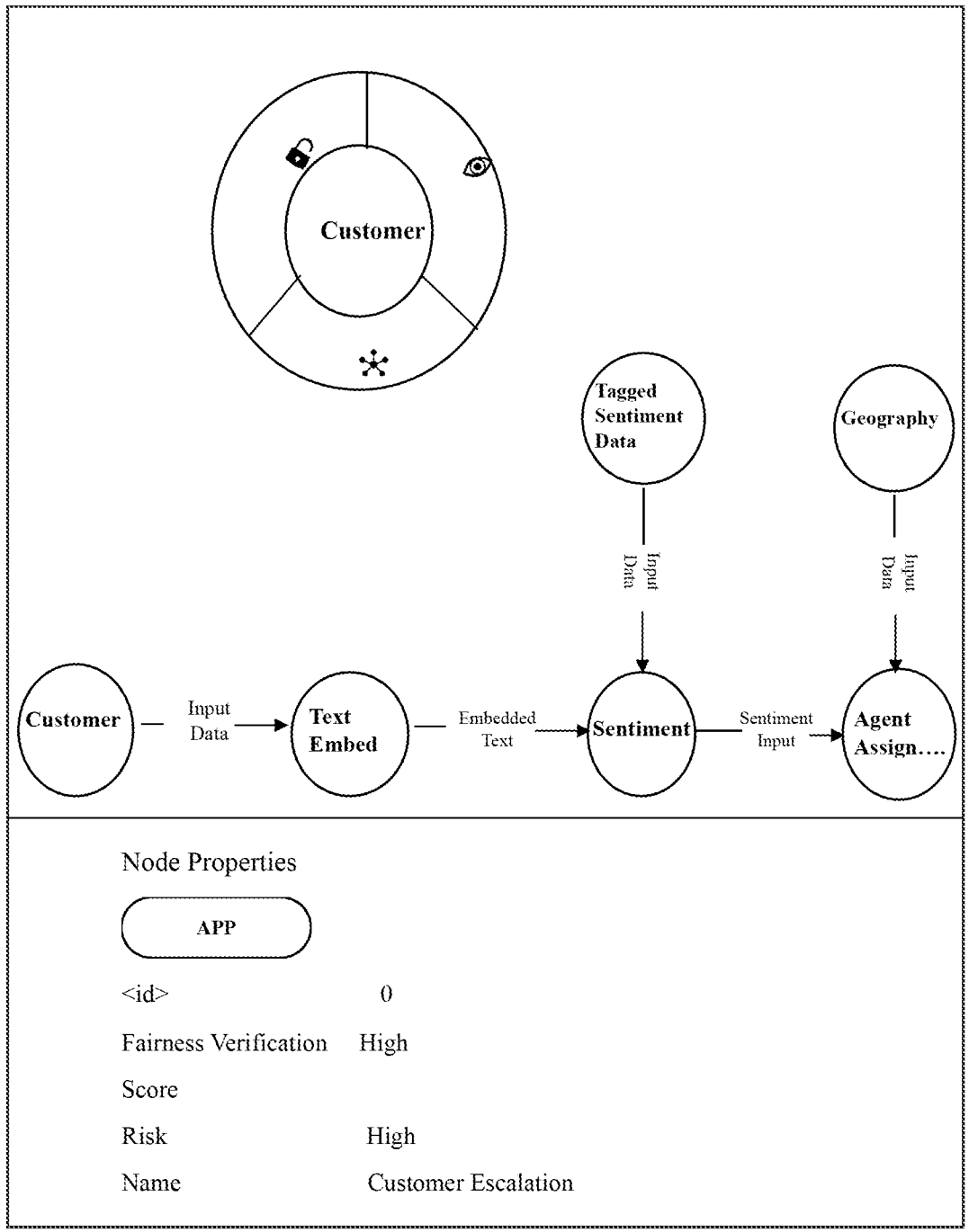
FIG. 4A-4E illustrates an exemplary process for automated discovery of AI/ML data input/data models and data classification, thereby determining location, definition and identification in a production code repository using Artificial Intelligence/Machine Learning, according to an embodiment herein.

FIG. 4A-4E illustrates an exemplary process for automated discovery of AI/ML data input/data models and data classification, thereby determining location, definition and identification in a production code repository using Artificial Intelligence/Machine Learning, according to an embodiment herein. FIG. 4A illustrates an exemplary process for determining fairness verification score of a customer escalation and thus categorizing the risk as high, medium and low, according to an embodiment herein. The fairness verification score ensures quality, reduces ambiguity, enables comparison and improves the trustworthiness of the AI systems. Customer support applications regularly rely on AI/ML models to predict the escalation severity. These models are built such that they predict the escalation severity based on the attributes present in the customer issue. Some often-used fields include description of the customer issue, geo-location of the customer etc. Such a model is considered to be not fair if it is built using direct or derived variables that are immediately known to be unfair.

Figure 4B:
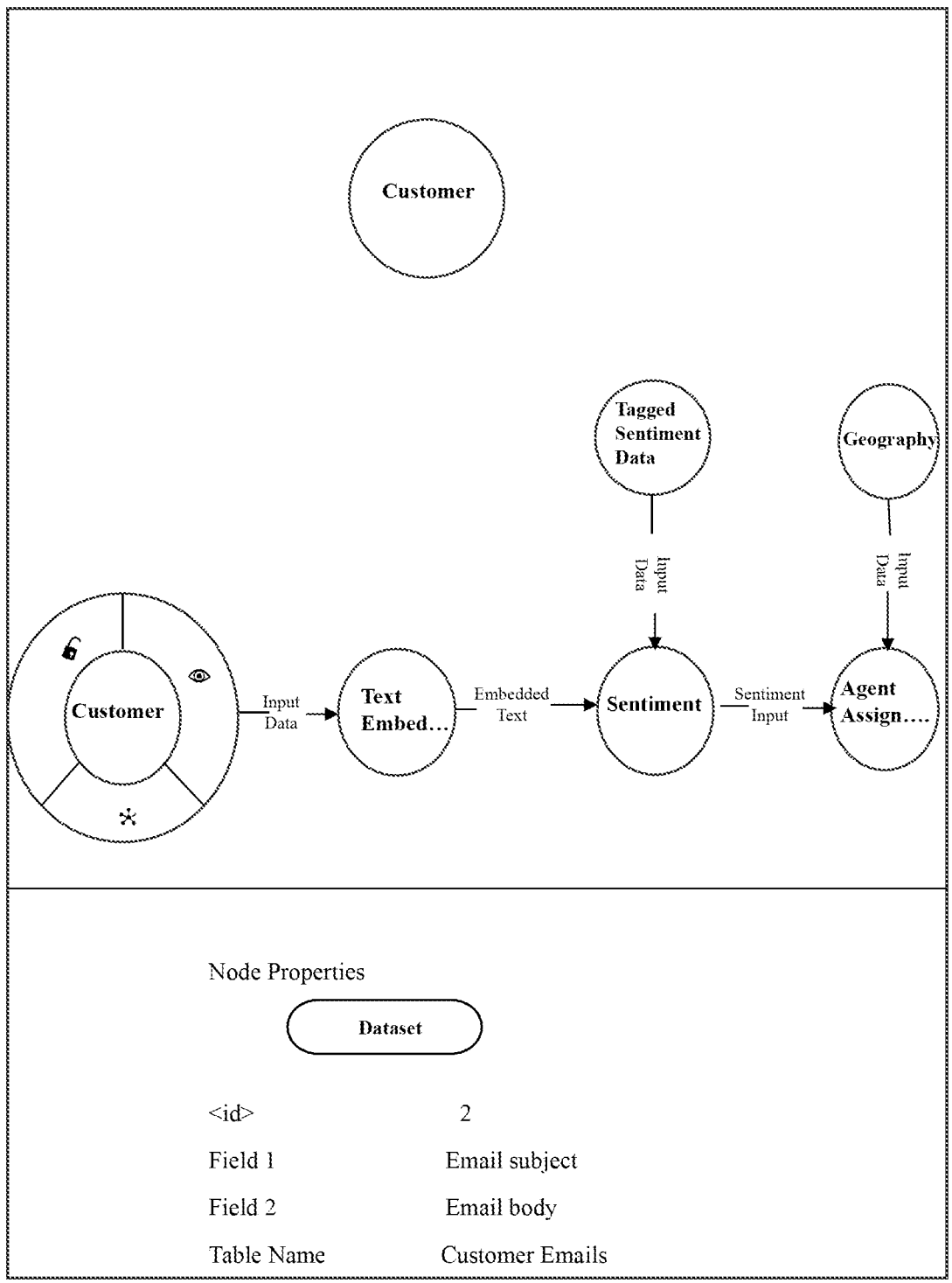
Figure 4C:
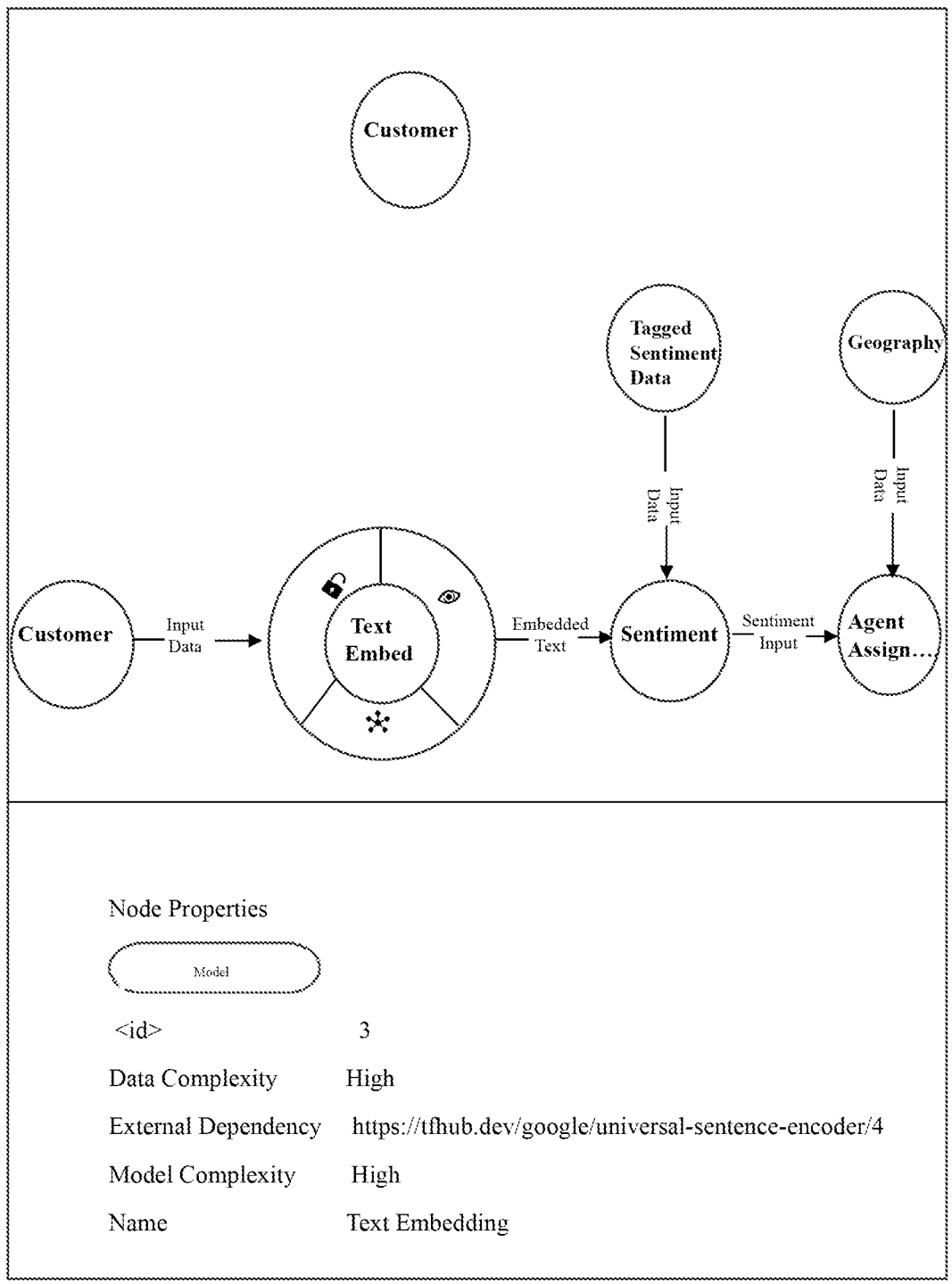

FIG. 4B illustrates an exemplary process for identifying datasets provided by the customer such as Email-id, subject and body, according to an embodiment herein. A data set herein refers to a raw unstructured text data used for Natural Language Processing (NLP) techniques of AI/ML. FIG. 4C illustrates an exemplary process for identification of the open-source NLP model used for text embedding, according to an embodiment herein. For instance, identification of open-source Universal encoder model and URL of the model in the TenserFlow Hub. The TenserFlow Hub is a repository of trained machine learning models. FIG. 4C provides a process for selecting open-source NLP model. In the process two models are considered namely: Model A and Model B. The process includes selecting two sets of code files ensuring that the two sets are made of functionally similar code files. The process further includes tagging/pre-classifying selected sets of code based on AI/ML functional usage. Further, the process involves embedding the significant pieces of each set using Model A and Model B and determining how well the Model A captures the actual similarity that exists between the two sets. For instance, if Model A is good, the observed similarity must be very good because that is how the two sets are chosen. Furthermore, the process includes determining how well the Model B captures the actual similarity that exists between the two sets. For instance, if Model B is good, the observed similarity must be very good because that is how the two sets are chosen. Finally, the process involves choosing the model that provides the higher similarity value.

Figure 4D:
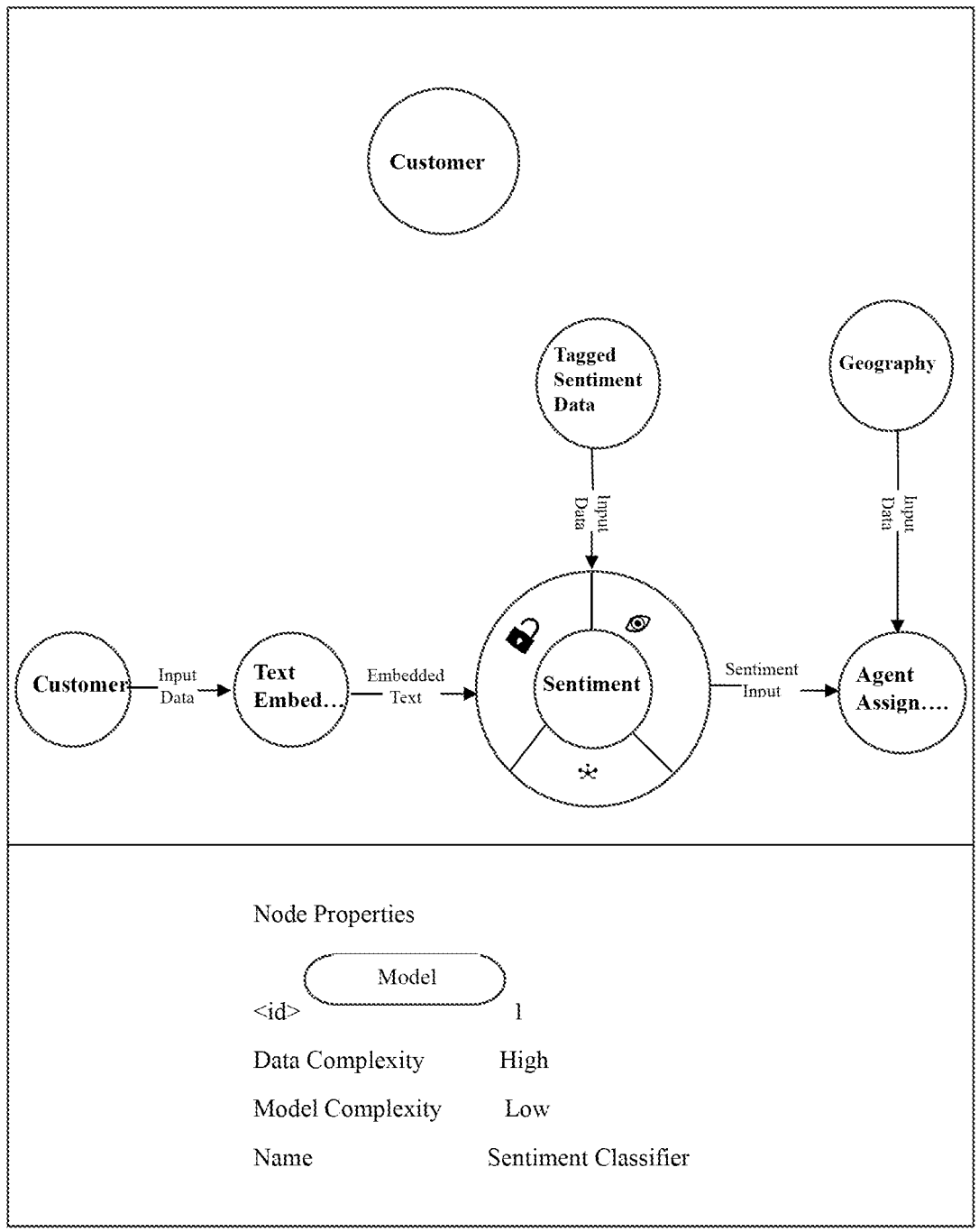

FIG. 4D illustrates an exemplary process for sentiment classification of the customer dataset using a Tagged Sentiment data and thereby determining the data and model complexity, according to an embodiment herein. Sentiment classification (also known as opinion mining or emotion AI) involves use of NLP, text analysis, computational linguistics and biometrics to systematically identify, extract, quantify and study affective state and subjective information. Furthermore, the Sentiment classification model is a model that determines the sentiment that exists in a given data for example a piece of text. For instance, with respect to a feedback on a product, a customer who bought that product may say, "This product is terrible and it does not work as advertised." A sentiment model would categorize this statement as negative. Contrast that with another review that reads, "This product is impressive. I love it and use it every day" where the sentiment is positive. Hence, the Sentiment classification models are often built using data that is tagged for training an accurate model where the tagging involves manually specifying the sentiment associated with each row of data and using that data to train the sentiment classification model.

Figure 4E:
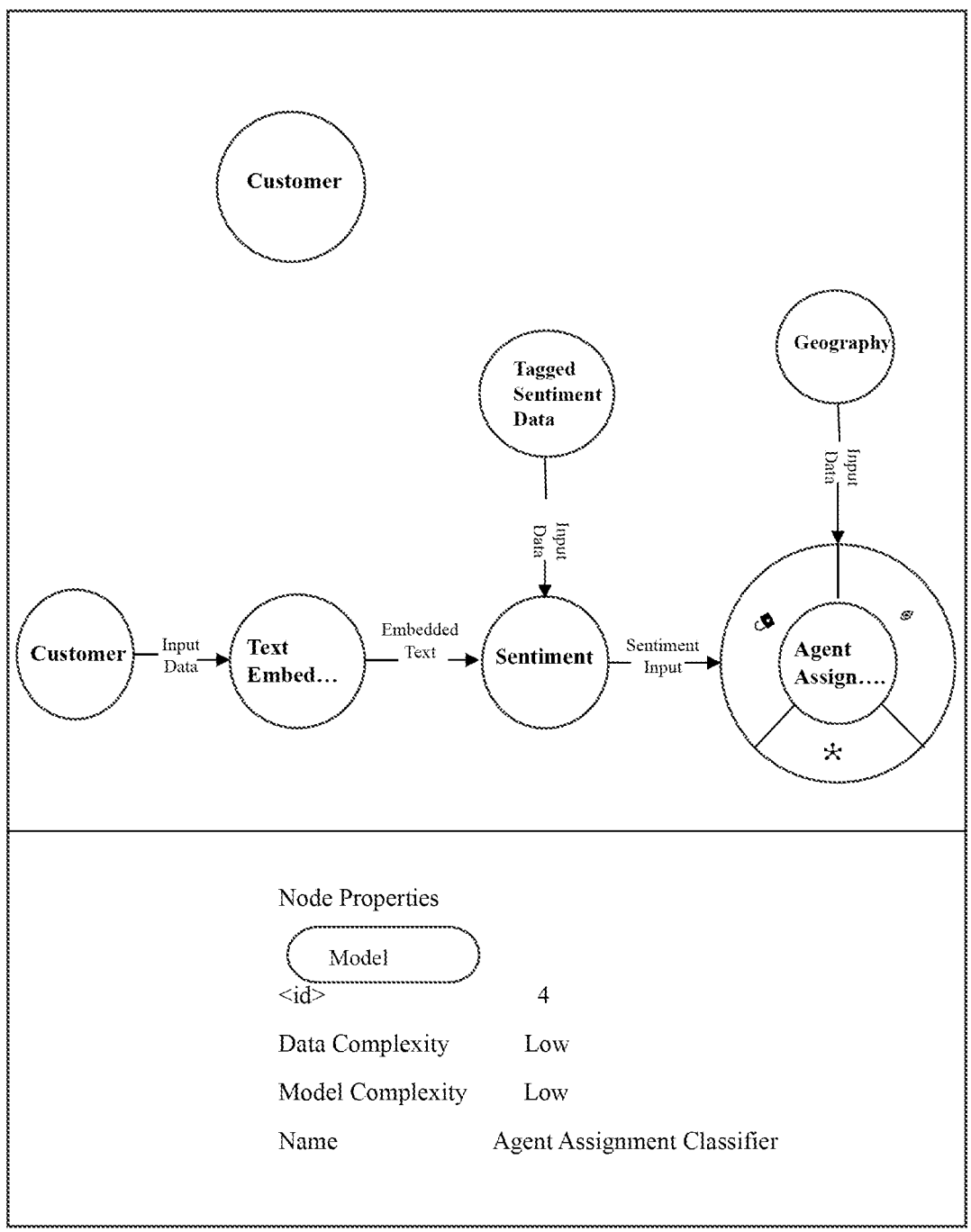

FIG. 4E illustrates an exemplary process for Agent Assignment Classification based on geographical data, according to an embodiment herein. The Agent assignment classification is a model that determines the right agent to work on an incoming problem ticket. As in Sentiment classification models of FIG. 4D, the agent classification models are also often built using data that is tagged for training an accurate model, where the tagging involves manually specifying the right agent associated with each row of data and using that data to train the model. A row of data can be made of geography of the problem ticket origin for example.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail above. It should be understood, however that it is not intended to limit the disclosure to the forms disclosed, but on the contrary, the disclosure is to cover all modifications, equivalents, and alternatives falling within the scope of the disclosure.

The embodiments herein disclose a computer-implemented system and method automatic discovery of the AI/ML models, their parameters, data input and output specifications and data transforms in a production code repository using Artificial Intelligence/Machine Learning. In addition, the embodiments herein also provide a method and system for the automatic discovery of the location, identification, classification, and definition of the AI/ML models, their parameters, data input and output specifications and data transforms, in the production code repository using Artificial Intelligence/Machine Learning. The technical advantages envisaged by the embodiment herein include the approach helps to bring about visibility, governance, and as-built documentation in a complex AI/ML-heavy source code base. Furthermore, the embodiment herein, provides a rational methodology for code analysis and assigns functional meanings to code snippets. The embodiments herein also allows presenting the data flow and code flow in a consistent manner. Furthermore, the embodiments herein helps to identify functionality of code, by giving semantic meaning to the code. The embodiments herein also analyses the potential risks that may exist in the code by semantic analysis of the code.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer-implemented method for automatic discovery of artificial intelligence/machine learning (AI/ML) models, and parameters, data input and output specifications, and data transforms thereof in a production code repository using AI/ML, the method comprising:
   a. automatically analyzing a plurality of source codes from a plurality of sources in conjunction with a production code repository, to identify a method of working on the plurality of source codes using the AI/ML, and wherein the plurality of sources comprise open source AI/ML libraries with Application Programming Interface (API) documentation and tagged/pre-classified code for the AI/ML models, including the data transforms and the data input and output specifications, and wherein automatically analyzing the plurality of source codes further includes:
  recursively crawling through the plurality of source codes embedded in the production code repository;
  selecting a source code file from the plurality of source codes based on an extension of the source code file; and
  building a knowledge graph in a knowledge graph database for selected source code file, based on significant characteristics of the selected source code file, and wherein the significant characteristics include imported libraries, classes, methods, functions, and variables referenced, set, and used in the selected source code file from the imported libraries, and wherein the significant characteristics further include the selected source code file and line numbers of the selected source code file;
b. performing a semantic match for the plurality of source codes embedded in the plurality of sources in conjunction with the production code repository, and wherein the semantic match provides location and identification of the plurality of sources, and the parameters thereof in the production code repository, and wherein the semantic match further provides location, identification, classification and definition of the data transforms and the data input and output specifications of the tagged/pre-classified code in the production code repository; and
c. generating a graphical view of data and a source code flow, and wherein the graphical view of the data tracks a flow of data through the plurality of source codes and depicts that the data is read into a variable, and the data read into the variable is fed into a function that fits a machine learning (ML) model, and wherein the graphical view of the source code flow is a graph depicting function calls, and wherein the function calls read files and train the ML model.

2. The method according to claim 1, wherein performing the semantic match for the plurality of source codes comprises matching keywords between the API documentation and the production code repository, and wherein the matching of keywords is carried out in a context of the plurality of source codes that surround a word of interest, and wherein the semantic match further creates a dense high-dimensional embedding of the API documentation and the production code repository using AI/ML techniques to compute a similarity between two embedded vectors, and wherein the dense high-dimensional embedding converts text into a large vector of numbers.

3. The method according to claim 2, wherein creating the dense high dimensional embedding comprises embedding the word of interest into a vector based on similarly sized text or the context surrounding the text.

4. The method (100) according to claim 1, wherein performing the semantic match for the plurality of source codes further comprises matching keywords between the plurality of source codes and the production code repository, and wherein matching of the keywords is carried out in a context of matching a vector associated with a keyword against a set of keywords, and wherein the vector determines whether the keyword is contextually similar to another keyword present within the set of keywords, and wherein the semantic match further creates a dense high-dimensional embedding of the plurality of source codes and the production code repository using AI/ML techniques to compute a similarity between two embedded vectors.

5. The method according to claim 1, wherein performing the semantic match for the tagged/pre-classified code in conjunction with the production code repository provides the ML model, and wherein said ML model predicts whether a production code in the production code repository is of a certain class of the tagged/pre-classified code and predicts the data input and output specifications and the data transforms.

6. The method according to claim 1, wherein performing the semantic match for the tagged/pre-classified code in conjunction with the production code repository comprises:
  establishing a large repository of open-source code;
  annotating significant pieces of the open-source code in the large repository, wherein the open-source code is the tagged/pre-classified code, and wherein the significant pieces of the open-source code include keywords, snippets of the open-source code carrying out functions of the AI/ML;
  embedding annotated significant pieces of the open-source code into vectors and assuming the annotated significant pieces of the open-source code to be left hand side (LHS) vectors;
  splitting non-open-source code into fragments, including keywords and snippets, embedding the snippets into the vectors, and assuming embedded snippets to be right hand side (RHS) vectors;
  matching vectors of the RHS with each vector on the LHS, and determining an LHS vector most similar to an RHS vector;
  associating the RHS vector with the LHS vector since an embedded snippet corresponding to the LHS vector is already tagged/pre-classified with significant information; and
  associating the significant information and meaning of the RHS vector with the production code repository;
and wherein providing the location, the identification, the classification and the definition of the data transforms and the data input and output specifications of the tagged/pre-classified code in the production code repository during the semantic match comprises:
  creating a semantically searchable knowledge base from the large repository of the open-source code;
  tagging the open-source code for the location, the classification, the data transforms, and the data input and output specifications; and
  creating queries to query the knowledge base, to produce an output in terms of the location, the identification, the classification, the data transforms, and the data input and output specifications of the tagged/pre-classified code.

7. The method according to claim 1, wherein providing the location and the identification of the plurality of sources, and the parameters thereof in the production code repository during the semantic match further includes providing pre-generated queries comprising information of the files and location of the files in a library function to read a data file, flow of variable into the function when contents of the data file are read into the variable, and wherein the method further includes ascertaining the function as the AI/ML and determining a source code file in which AI/ML function is used.

8. A computer-implemented system for automatic discovery of artificial intelligence/machine learning (AI/ML) models, parameters, data input and output specifications, and data transforms thereof in a production code repository using AI/ML, said computer-implemented system comprising:

a memory; and a processor coupled to the memory, said processor configured to:

automatically analyze a plurality of source codes from a plurality of sources in conjunction with a production code repository, and identify a method of working on the plurality of source codes using the AI/ML, and wherein the plurality of sources comprise Application Programming Interface (API) documentation, and tagged/pre-classified code for the AI/ML models, including data transforms, data input and output specifications, said processor further configured to:

recursively crawl through the plurality of source codes embedded in the production code repository;

select a source code file from the plurality of source codes, based on an extension of the source code file; and build a knowledge graph in a knowledge graph database for selected source code file, based on significant characteristics of the selected source code file, and wherein the significant characteristics include imported libraries, classes, methods, functions, and variables referenced, set, and used in the selected source code file from the imported libraries, and wherein the significant characteristics also include the selected source code file and line numbers of the selected source code file;

b. perform a semantic match for the plurality of source codes embedded in the plurality of sources in conjunction with the production code repository and provide location and identification of the plurality of sources, and parameters thereof in the production code repository, and wherein the processor is further configured to provide location, identification, classification and definition of the data transforms and the data input and output specifications of the tagged/pre-classified code in the production code repository; and c. generate a graphical view of data and a source code flow, and wherein the graphical view of the data tracks a flow of the data through the plurality of source codes and depicts that the data is read into a variable, and the data read into the variable is fed into a function that fits a machine learning (ML) model, and wherein the graphical view of the source code flow is a graph depicting function calls, and wherein the function calls read files and train the ML model.

9. The computer-implemented system according to claim 8, wherein the processor is further configured to perform the semantic match by matching keywords between the Application Programming Interface (API) documentation and the production code repository, and wherein matching of the keywords is carried out by the processor in a context of the plurality of source codes that surround a word of interest; and wherein the processor is further configured to create a dense high-dimensional embedding of the API documentation and the production code repository using AI/ML techniques to compute similarity between two embedded vectors, and wherein the dense high-dimensional embedding converts text into a large vector of numbers.

10. The computer-implemented system according to claim 9, wherein the processor creates the dense high dimensional embedding by embedding the text or a word into a vector, based on similarly sized text or the context surrounding the text.

11. The computer-implemented system according to claim 8, wherein the processor performs the semantic match by matching keywords between the plurality of source codes and the production code repository, and wherein matching of the keywords is carried out in a context of matching a vector associated with a keyword against a set of keywords, and wherein the vector determines if the keyword is contextually similar to another keyword present within the set of keywords, and wherein the processor further creates a dense high-dimensional embedding of the plurality of source codes and the production code repository using AI/ML techniques to compute a similarity between two embedded vectors.

12. The computer-implemented system according to claim 8, wherein the processor performs the semantic match for the tagged/pre-classified code in conjunction with the production code repository and provides the ML model that predicts whether a production code in the production code repository is of a certain class of the tagged/pre-classified code and further predicts the data input and output specifications and the data transforms.

13. The computer-implemented system according to claim 8, wherein the processor performs the semantic match for the tagged/pre-classified code in conjunction with the production code repository by:

establishing a large repository of open-source code;

annotating significant pieces of the open-source code in the large repository, wherein the open-source code is the tagged/pre-classified code, and wherein the significant pieces of the open-source code include keywords, snippets of the open-source code carrying out functions of the AI/ML;

embedding annotated significant pieces of the open-source code into vectors and assuming the annotated significant pieces of the open-source code to be left hand side (LHS) vectors;

splitting non-open-source code into fragments, including keywords and snippets, embedding the snippets into the vectors, and assuming embedded snippets to be right hand side (RHS) vectors;

matching vectors of the RHS with each vector on the LHS, and determining an LHS vector most similar to an RHS vector;

associating the RHS vector with the LHS vector since an embedded snippet of corresponding to the LHS vector is already tagged/pre-classified with significant information; and associating the significant information and meaning of the RHS vector with the production code repository;

and wherein the processor provides the location, the identification, the classification and the definition of the data transforms and the data input and output specifications of the tagged/pre-classified code in the production code repository during the semantic match by:

creating a semantically searchable knowledge base from the large repository of the open-source code;

tagging the open-source code for the location, the classification, the data transforms, and the data input and output specifications; and creating queries to query the knowledge base, to produce an output in terms of the location, the identification, the classification, the data transforms, and the data input and output specifications of the tagged/pre-classified code.

14. The computer-implemented system according to claim 8, wherein the processor provides the location and the identification of the plurality of sources, and the parameters thereof in the production code repository during the semantic match by providing pre-generated queries comprising information of the files and location of the files in a library function to read a data file, flow of variable into the function when the contents of the file are read into the variable, and wherein the processor ascertains the function as the AI/ML and determines a source code file in which AI/ML function is used.

* * * * *